United States Patent
Wang et al.

(10) Patent No.: US 9,449,395 B2
(45) Date of Patent: Sep. 20, 2016

(54) METHODS AND SYSTEMS FOR IMAGE MATTING AND FOREGROUND ESTIMATION BASED ON HIERARCHICAL GRAPHS

(71) Applicant: Winbond Electronics Corp., Taichung (TW)

(72) Inventors: Sheng-Jyh Wang, Hsinchu (TW); Chen-Yu Tseng, Pingzhen (TW)

(73) Assignee: Winbond Electronics Corp., Taichung (TW)

( * ) Notice: Subject to any disclaimer, the term of this patent is extended or adjusted under 35 U.S.C. 154(b) by 50 days.

(21) Appl. No.: 14/486,158

(22) Filed: Sep. 15, 2014

(65) Prior Publication Data

US 2016/0078634 A1    Mar. 17, 2016

(51) Int. Cl.
*G06K 9/34* (2006.01)
*G06T 7/00* (2006.01)
*G06K 9/46* (2006.01)
*G06K 9/52* (2006.01)

(52) U.S. Cl.
CPC ........... *G06T 7/0093* (2013.01); *G06K 9/4642* (2013.01); *G06K 9/522* (2013.01); *G06T 2207/20144* (2013.01)

(58) Field of Classification Search
None
See application file for complete search history.

(56) References Cited

U.S. PATENT DOCUMENTS

| 7,430,339 | B2 | 9/2008 | Rother et al. |
| 7,440,615 | B2 | 10/2008 | Gong et al. |
| 7,636,128 | B2 * | 12/2009 | Sun .................... G06T 17/0083 345/630 |
| 7,692,664 | B2 | 4/2010 | Weiss et al. |
| 8,175,384 | B1 * | 5/2012 | Wang .................... G06T 7/0081 348/586 |
| 8,306,333 | B2 | 11/2012 | Lai et al. |
| 8,320,666 | B2 | 11/2012 | Gong |
| 8,386,964 | B2 | 2/2013 | Sun et al. |
| 8,477,149 | B2 | 7/2013 | Beato et al. |
| 8,520,972 | B2 | 8/2013 | Sunkavalli et al. |
| 8,611,728 | B2 | 12/2013 | Bhagavathy et al. |

(Continued)

FOREIGN PATENT DOCUMENTS

| CN | 101689394 A | 3/2010 |
| CN | 103177446 | 6/2013 |

(Continued)

OTHER PUBLICATIONS

A. Levin, D. Lischinski, Y. Weiss, "A Closed Form Solution to Natural Image Matting," *IEEE Trans.Pattern Analysis and Machine Intelligence*, vol. 30, No. 2, pp. 228-242, 2008. (published before this application Sep. 2014).

(Continued)

*Primary Examiner* — Eueng-Nan Yeh
(74) *Attorney, Agent, or Firm* — Finnegan, Henderson, Farabow, Garrett & Dunner LLP

(57) ABSTRACT

In accordance with an embodiment, a method for image matting based on a hierarchical graph model, comprises receiving an input image including a plurality of image elements; generating a plurality of matting cells based on the input image, each cell including a group of image elements; calculating affinity values for the plurality of matting cells based on the input image; forming a graph based on the plurality of matting cells and the affinity values, the graph including a plurality of nodes representing the matting cells and a plurality of edges associated with the affinity values of the matting cells; and generating a plurality of matting components for the input image based on the graph.

19 Claims, 14 Drawing Sheets

Initial Graph 202

Contracted Graph 204

(56) References Cited

U.S. PATENT DOCUMENTS

| | | | |
|---|---|---|---|
| 8,625,888 | B2 | 1/2014 | Sun et al. |
| 8,625,896 | B2 | 1/2014 | Yang et al. |
| 8,818,038 | B2 | 8/2014 | Peleg et al. |
| 2010/0067824 | A1 | 3/2010 | Sunkavalli et al. |
| 2010/0092037 | A1 | 4/2010 | Peleg et al. |
| 2012/0023456 | A1 | 1/2012 | Sun et al. |
| 2012/0327172 | A1 | 12/2012 | El-Saban et al. |
| 2013/0027551 | A1 | 1/2013 | Peleg et al. |
| 2013/0051663 | A1* | 2/2013 | Krishnaswamy ........ G06K 9/00 382/164 |
| 2013/0114942 | A1 | 5/2013 | Yu et al. |
| 2013/0195361 | A1 | 8/2013 | Deng et al. |

FOREIGN PATENT DOCUMENTS

| | | |
|---|---|---|
| CN | 102289796 B | 4/2014 |
| TW | 201331772 A | 8/2013 |

OTHER PUBLICATIONS

D. Singaraju, R. Vidal, "Estimation of Alpha Mattes for Multiple Image Layers," *IEEE Trans. Pattern Analysis and MachineIntelligence*, vol. 33, No. 7, pp. 1295-1309, 2011. (published before this application Sep. 2014).

A. Levin, A. Rav-Acha, D. Lischinski, "Spectral Matting," *IEEE Trans. Pattern Analysis and Machine Intelligence*, vol. 30, No. 10, pp. 1699-1712, 2008. (published before this application Sep. 2014).

S. Paris and F. Durand, "A fast approximation of the bilateral filter using a signal processing approach," *In European Conference on Computer Vision*, pp. 568-580, 2006. (published before this application Sep. 2014).

J. Chen, S. Paris, F. Durand, "Real-time edge-aware image processing with the bilateral grid," in *ACM Transactions on Graphics*, pp. 103, 2007. (published before this application Sep. 2014).

K. He, J. Sun, and X. Tang, "Fast matting using large kernel matting laplacian matrices," in *ComputerVision and Pattern Recognition*, pp. 2165-2172, 2010. (published before this application Sep. 2014).

C. Rhemann, C. Rother, and M. Gelautz. "Improving color modeling for alpha matting," in *BMVC*, 2008. (published before this application Sep. 2014).

E. S. L. Gastal and M. M. Oliveira, "Shared sampling for real-time alpha matting," *Eurographics*, vol. 29, pp. 575-584, 2010. (published before this application Sep. 2014).

U. von Luxburg, "A tutorial on spectral clustering," *Technical Report 149*, Max Plank Institute for Biological Cybernetics, 2006. (published before this application Sep. 2014).

M. Huang, F. Liu and E. Wu, "A GPU-based matting Laplacian solver for high resolution image matting," *J. Vis. Comput.*,vol. 26, No. 6-8, pp. 943-950, 2010. (published before this application Sep. 2014).

D. Singaraju, C. Rother, and C. Rhemann, "New appearance models for natural image matting," in *Computer Vision and Pattern Recognition*, pp. 659-666, 2009. (published before this application Sep. 2014).

Y. Zheng and C. Kambhamettu, "Learning based digital matting," in *Int. Conf. Computer Vision*, pp. 889-896, 2009. (published before this application Sep. 2014).

P. Lee and Y. Wu, "Nonlocal matting," in *Computer Vision and Pattern Recognition*, pp. 2193-2200, 2011. (published before this application Sep. 2014).

Y. Weiss, "Segmentation Using Eigenvectors: A Unifying View," *Proc. Int. Conf. Computer Vision*, pp. 975-982, 1999. (published before this application . Sep. 2014).

J. Shi and J. Malik, "Normalized Cuts and Image Segmentation," *IEEE Trans. Pattern Analysis and Machine Intelligence*, vol. 22, No. 8, pp. 888-905, Aug. 2000. (published before this application Sep. 2014).

A. Ng, M. Jordan, and Y. Weiss, "On Spectral Clustering: Analysis and an Algorithm," *Proc. Advances in Neural Information Processing Systems*, 2001. (published before this application Sep. 2014).

J.-Z. Wang, C.-H. Li, "Spectral matting based on color information of matting components," *Advances in Wireless Networks and Information Systems 72*, pp. 119-130, 2010. (published before this application Sep. 2014).

Wu-Chih Hu, Jia-Jie Jhu, Cheng-Pin Lin, "Unsupervised and reliable image matting based on modified spectral matting," *J. Vis. Commun. Image R.* 23, pp. 665-676, 2012. (published before this application Sep. 2014).

M. Eisemann, J. Wolf, M. Magnor, "Spectral video matting," *In Proc. Vision, Modeling and Visualization (VMV)*, 2009. (published before this application Sep. 2014).

B. Bollobás, *Modern graph theory*. New York: Springer-Verlag, 1998. (published before this application Sep. 2014).

A. Brouwer, W. Haemers, *Spectra of graphs*. Springer, 2012. (published before this application Sep. 2014).

Chen-Yu Tseng, Sheng-Jyh Wang, "Maximum-a-posteriori estimation for global spatial coherence recovery based on matting Laplacian," in *IEEE International Conference on Image Processing (ICIP)*, 2012. (published before this application Sep. 2014).

Alpha Matting Evaluation Website, www.alphamatting.com, May 7, 2009.

Radhakrishna Achanta, Appu Shaji, Pascal Fua, and Sabine Süsstrunk, "Database Saliency and Image Summaries," http://ivrg.epfl.ch/supplementary_material/RK_SIGGRAPH_Asia09/index.html, Mar. 6, 2014.

"Fast matting Using Large Kernel matting Laplacian Matrices," http://research.microsoft.com/en-us/um/people/kahe/cvpr10/index.htm, Oct. 23, 2013.

C. Rhemann, C. Rother, J. Wang, M. Gelautz, P. Kohli, P. Rott; "A Perceptually Motivated Online Benchmark for Image Matting," Proceedings of the IEEE Conference on Computer Vision and Pattern Recognition, Jun. 2009, 8 pages.

Home page of Anat Levin, http://www.wisdom.weizmann.ac.il/~levina/, Apr. 8, 2009.

Office Action received from Taiwan Patent Office dated Jan. 18, 2016.

Response dated Mar. 18, 2016, submitted to Taiwan Patent Office.

\* cited by examiner

Contracted Image 304

Input Image 302

FIG. 5(b) Near-range Affinity
FIG. 5(c) Far-range Affinity
FIG. 5(d) Multi-Scale Affinity

METHODS AND SYSTEMS FOR IMAGE MATTING AND FOREGROUND ESTIMATION BASED ON HIERARCHICAL GRAPHS

FIELD OF THE DISCLOSURE

This disclosure is related to image matting in general and, more particularly, image matting and foreground estimation based on hierarchical graphs.

BACKGROUND

Image matting is a process of extracting foreground objects from an image, along with a parameter called an alpha matte. This process leads to useful applications, such as image and video editing, image layer decomposition, and scene analysis. In image matting, a pixel value Ii at a pixel i may be modeled as a linear combination of a foreground color value Fi and a background color value $B_i$. That is, $$I_i = \alpha_i F_i + (1-\alpha_i) B_i, \qquad (1)$$

where $\alpha_i$ represents the alpha matte value corresponding to opacity of the foreground color.

Conventional image matting techniques can be generally classified into two categories: supervised matting and unsupervised matting. In supervised matting, a user's guidance is provided to label a few pixels to be either "foreground" or "background." Based on these labeled pixels, a supervised matting method estimates the alpha matte values for remaining unlabeled pixels. In contrast, unsupervised matting aims to automatically estimate the alpha matte from the input image without any user guidance.

Conventional image matting techniques have several drawbacks. First, conventional unsupervised matting techniques are computationally intensive. Although image processing schemes have been proposed to reduce the required computations, these existing schemes may result in degraded image quality.

Second, results produced by conventional image matting techniques may not always be consistent. Lack of global information during the matting process makes it difficult to produce consistent results in dealing with images with cluttered scenes.

Third, conventional unsupervised matting techniques focus on binary partitioning of image content. Since an image may contain more than one foreground object, results generated by these conventional unsupervised matting techniques may not be very practical.

SUMMARY

In accordance with an embodiment, a method for image matting based on a hierarchical graph model, comprises receiving an input image including a plurality of image elements; generating a plurality of matting cells based on the input image, each cell including a group of image elements; calculating affinity values for the plurality of matting cells based on the input image; forming a graph based on the plurality of matting cells and the affinity values, the graph including a plurality of nodes representing the matting cells and a plurality of edges associated with the affinity values of the matting cells; and generating a plurality of matting components for the input image based on the graph.

In accordance with another embodiment, a method for image matting based on hierarchical graphs, comprises receiving an input image including a plurality of image elements; forming a first graph based on the input image, the first graph including a plurality of first nodes representing the image elements and a plurality of first edges representing affinity relationships among the image elements; forming a second graph by grouping the image elements into a plurality of cells, the second graph including a plurality of second nodes representing the cells and a plurality of second edges representing affinity relationships among the cells; forming a third graph by decomposing the second graph into a plurality of matting components, the third graph including a plurality of third nodes representing the matting components and a plurality of edges representing affinity relationships among the matting components; and determining probabilities of the matting components belonging to a foreground region of the input image based on the third graph.

In accordance with another embodiment, a non-transitory computer-readable medium stores instructions, which, when executed by a processor, cause the processor to perform a method for image matting based on hierarchical graphs. The method comprises receiving an input image including a plurality of image elements; generating a plurality of matting cells based on the input image, each cell including a group of image elements; calculating affinity values for the plurality of matting cells based on the input image; forming a graph based on the plurality of matting cells and the affinity values, the graph including a plurality of nodes representing the matting cells and a plurality of edges representing affinity information of the matting cells; and generating a plurality of matting components for the input image based on the graph.

Additional features and advantages will be set forth in part in the description which follows, and in part will be obvious from the description, or may be learned by practice of the disclosed embodiments. The features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the disclosure.

BRIEF DESCRIPTION OF THE DRAWINGS

FIGS. 5(a)-5(d) illustrate exemplary embodiments of fixed-resolution schemes and a multi-resolution scheme for cell-level graph modeling;

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

According to some embodiments of the disclosure, a hierarchical framework is disclosed to perform image matting, including supervised and unsupervised matting. Based on a bottom-up mechanism, the hierarchical framework gradually condenses image data from pixels to cells, from cells to components, and finally from components to matting layers. More specifically, at a first level (i.e., the pixel level) of the hierarchical framework, image pixels are first condensed to cells through a pixel-to-cell mapping. This mapping is based on an assumption that neighboring data in a feature space tend to share similar matting values. This condensation process can greatly reduce required computations for spectral analysis without generating noticeable quality degradation.

At a second level (i.e., the cell level), the cell-based structure provides learning of multi-scale affinity based on a cell-level graph. The multi-scale affinity learning may effectively improve the performance of spectral analysis when dealing with images of cluttered scenes. From the cell-level graph, matting components are automatically extracted by solving a graph partitioning problem.

At a third level (i.e., the component level), a component-level graph is generated for the estimation of multiple matting layers. According to a further embodiment, a foreground probability distribution model is applied to stochastically generate a list of possible foreground mattes and estimate the foreground possibility for the matting layers.

Figure 1A:
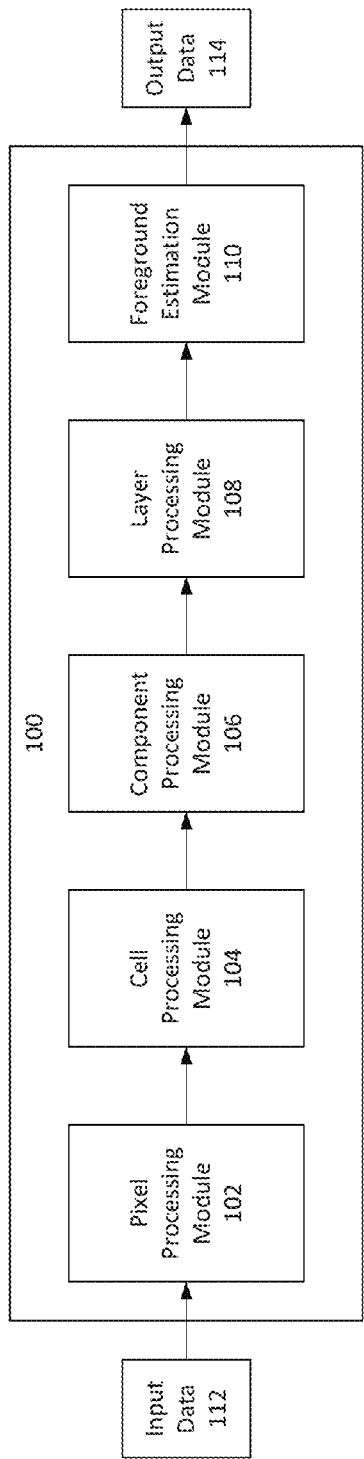
FIG. 1A is a block diagram of an exemplary system for image matting based on hierarchical graphs, according to an embodiment.

FIG. 1A depicts a system 100 for image matting based on hierarchical graphs, according to an embodiment of the disclosure. System 100 includes a pixel processing module 102, a cell processing module 104, a component processing module 106, a layer processing module 108, and a foreground estimation module 110. Modules 102-110 may be arranged in series so that pixel processing module 102 receives input data 112 and foreground estimation module 110 produces output data 114. Cell processing module 104, component processing module 106, and layer processing module 108 carry out intermediate processing steps according to the order shown in FIG. 1A. One or more of modules 102-110 may be omitted from system 100. For example, layer processing module 108 may be omitted, so that foreground estimation module 110 generates output data based on data provided by component processing module 106.

Figure 1B:
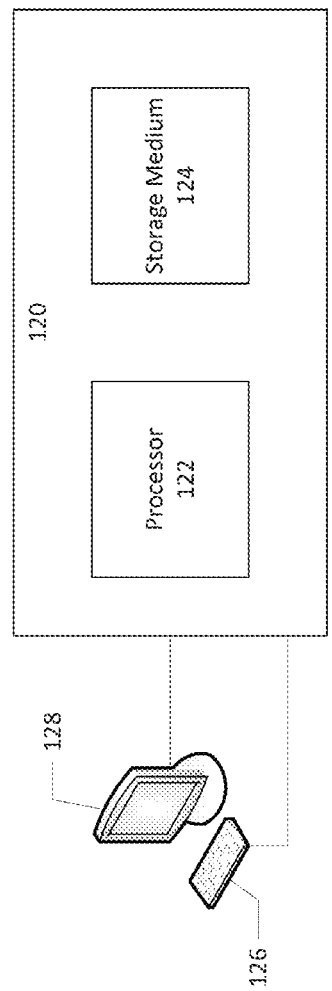
FIG. 1B is a schematic diagram of a computer system for implementing the system of FIG. 1A, according to an embodiment.

In one embodiment, modules 102-110 shown in FIG. 1A may be implemented by a computer system 120 shown in FIG. 1B including a processor 122 and a non-transitory computer-readable medium 124. Processor 122 can be a central processing unit (CPU), such as an INTEL processor, an AMD processor, or other processor known in the art. Computer-readable medium 124 can include a hard drive, a flash drive, a CD, a DVD, a RAM, a ROM, or the like, which is configured to store instructions and data relevant to the image matting technique disclosed herein. The instructions can be written in C, C++, BASIC, FORTRAN, JAVA, or other programming languages known in the art. Processor 122 receives the instructions and data from computer-readable medium 124 and carries out the functions of modules 102-110 as described here.

In another embodiment, modules 102-110 may be implemented on a programmable integrated circuit, such as a programmable logic array, a field-programmable gate array, an application-specific integrated circuit, and the like.

System 100 may further include user input/output (I/O) devices 126 and 128, such as a display device 128, a keyboard 126, a mouse, a touchpad, a touch screen, and the like. For example, system 100 receives user input through keyboard 126 and applies the image matting techniques to the input data according to the user input. System 100 then presents the output data to a user through display device 128.

Input data 112 may include image data or video data provided by a user or an external system or received from a storage medium such as a hard drive, a flash drive, a CD, a DVD, a RAM, a ROM, etc. Input data 112 may represent images or video frames of any natural scenes captured by an imaging system, such as a camera or a camcorder. Input data 112 may also represent images or video frames of synthetic or artificial scenes that are generated by a computer. The scenes represented by input data 112 include one or more foreground objects that are relatively close to the imaging system that captures the images or video frames. The scenes also include one or more background objects that are relatively further away from the imaging system that captures the images or video frames.

The images or video frames in input data 112 may be represented by image elements, such as pixels, arranged in one or more regular arrays including rows and columns. Each image element includes one or more values defined according to a color space, such as the RGB color space, the CMYK color space, or other color spaces known in the art. In one embodiment, each image element is associated with either one of the foreground objects or one of the background objects, such that the image element represents part of the foreground object or the background object. In another embodiment, each image element may be associated with a combination of one of the foreground objects and one of the background objects, such that the image elements falls on an image boundary between the foreground objects and the background objects.

Output data 114 may identify the image elements in the input data that are associated with the foreground objects and/or the background objects. In one embodiment, output data 114 includes a mask having a plurality of elements. Each element of the mask is associated with an image element of input data 112 and includes a value, such as an alpha matte value, which correspond to the opacity of one of foreground objects. For example, an element of the mask having a value of zero may identify a completely transparent foreground object or lack of foreground objects, such that the associated image element is associated with a background object. An element of the mask having a value of one may correspond to a completely opaque foreground object, such that the associated image element is associated with the foreground object. An element of the mask having a fractional value may correspond to a combination of a foreground object and a background object. This occurs when the foreground object is partially transparent or the image element falls on the image boundary between the foreground object and the background object. The fractional value represents a contribution by the foreground object to the associated image element.

According to the embodiments of this disclosure, system 100 applies image matting process to input data 112 based on a hierarchical graph model. The hierarchical graph model includes a plurality of levels, such as the pixel level, the cell level, and the component level. Accordingly, the disclosed process includes a plurality of stages executed by respective modules 102-110. These stages include, for example, a pixel-level processing stage, a cell-level processing stage, and a component-level processing stage. Data produced by component processing module 106 may be further processed by layer processing module 108 and foreground estimation module 110 to generate output data 114. As the process proceeds through the stages, the number of elements in the processed data is gradually reduced, thereby providing an efficient and accurate estimate of the foregrounds and the alpha mattes of input data 112. Details of modules 102-110 are further described hereinafter with reference to FIGS. 2-10.

Contraction Process

According to an embodiment, the pixel-level processing stage forms the first stage of the image matting process based on the hierarchical graph model. The pixel-level processing stage is carried out by pixel-processing module 102. Module 102 is configured to condense image elements, such as pixels, in input data 112 into compact cells in order to reduce the required computations in subsequent stages. The term "condense" as used herein refers to a process of spatially gathering similar image pixels together.

To condense pixels, module 102 applies a local contraction process based on a minimization of a graph-based energy function. Details of the local contraction process are explained as follows.

In the local contraction process, input data 112, such as an input image, is first represented as a graph, where vertices of the graph represent the pixel-wise intensity data and each edge between a pair of vertices represents an affinity between the corresponding pixel pair. Here, the affinity value $A_q(i,j)$ between two pixels i and j is defined as:

$$A_q(i,j) = \frac{1}{|\omega_q|}\left(1 + (I_i - \mu_q)^T \left(\Sigma_q + \frac{\varepsilon}{|\omega_q|}U\right)^{-1}(I_j - \mu_q)\right). \quad (2)$$

In equation (2) above, $I_i$ and $I_j$ represent color values of an input image I at pixels i and j, $\mu_q$ represents a 3×1 mean color vector in a window $\omega_q$ of pixels, $\Sigma_q$ represents a 3×3 covariance matrix, $|\omega_q|$ represents the number of pixels in the local window $\omega_q$, U represents a 3×3 identity matrix, and $\varepsilon$ represents a regularization term to avoid over-fitting in smooth regions. For example, in a smooth region, entries in $\Sigma_q$ have relatively small values so that a small deviation caused by noise may induce a large variation of the affinity value. By properly adding a small value of $\varepsilon$, fluctuations of the affinity value in smooth regions can be effectively suppressed. According to equation (2), if two pixels have similar color appearance, the affinity value between them is relatively large. The local window $\omega_q$ is used to scan through the whole image to produce several affinity values for every edge in the input image. By averaging these affinity values for each edge, a pixel-level graph model is generated.

According to an embodiment, an x-y coordinate system is defined for the input image I, wherein the x-axis is along a first dimension of the pixel array and the y-axis is along a second dimension of the pixel array. The x-coordinate and the y-coordinate of each image pixel are normalized to the range of [0, 1]. In addition, it is assumed that (x, y) represent the normalized coordinates, that is, the original spatial coordinates of the $i^{th}$ pixel in the input image, and $(\tilde{x}, \tilde{y})$ represent the contracted coordinates, that is, the spatial coordinates of the $i^{th}$ pixel after the local contraction process. Moreover, the following vectors are defined based on the pixel coordinates:

$$x=[x_1\ x_2\ \ldots\ x_N]^T,\ y=[y_1\ y_2\ \ldots\ y_N]^T,\ \tilde{x}=[\tilde{x}_1\ \tilde{x}_2\ \ldots\ \tilde{x}_N]^T,\ \text{and}\ \tilde{y}=[\tilde{y}_1\ \tilde{y}_2\ \ldots\ \tilde{y}_N]^T,$$

where N represents the total number of pixels in the input image. Accordingly, the local contraction process may be represented as derivations of optimal vectors, $\tilde{x}$ and $\tilde{y}$, which minimize the following energy functions $E_x(\tilde{x})$ and $E_y(\tilde{y})$:

$$E_x(\tilde{x}) = \sum_{\omega_q} \sum_{i,j \in \omega_q} A_q(i,j)(\tilde{x}_i - \tilde{x}_j)^2 + \lambda_x \sum_{k=1}^N (\tilde{x}_k - x_k)^2, \quad (3)$$

and $$E_y(\tilde{y}) = \sum_{\omega_q} \sum_{i,j \in \omega_q} A_q(i,j)(\tilde{y}_i - \tilde{y}_j)^2 + \lambda_y \sum_{k=1}^N (\tilde{y}_k - y_k)^2. \quad (4)$$

In each of functions (3) and (4), the first term on the right hand side corresponds to the pair-wise cohesion forces that tend to pull pixels spatially closer, while the second term on the right hand side corresponds to the deviation cost that seeks to preserve the original image structure. Parameters $\lambda_x$ and $\lambda_y$ are used to control the strength of contraction.

In order to find the optimal vectors $\tilde{x}$ and $\tilde{y}$, equations (3) and (4) are rewritten as:

$$E_x(\tilde{x})=2\tilde{x}^T L\tilde{x}+\lambda_x(\tilde{x}-x)^T(\tilde{x}-x), \quad (5)$$

and $$E_y(y)=2\tilde{y}^T L\tilde{y}+\lambda_x(\tilde{y}-y)^T(\tilde{y}-y). \quad (6)$$

Here, L denotes the graph Laplacian matrix, whose off-diagonal entries are defined as $L(i,j)=-\Sigma_{\omega_q|(i,j)\in\omega_q}A_q(i,j)$, diagonal entries are defined as $L(i,i)=\Sigma_j\Sigma_{\omega_q|(i,j)\in\omega_q}A_q(i,j)$, and T represents the transpose operator. By differentiating equations (5) and (6) with respect to $\tilde{x}$ and $\tilde{y}$ respectively, the following linear system is produced:

$$(2L+\lambda_x I)\tilde{x}=\lambda_x x, \quad (7)$$

and $$(2L+\lambda_y I)\tilde{y}=\lambda_y y. \quad (8)$$

The optimal solutions are then solved based on the above linear system of equations (7) and (8).

Figure 2:
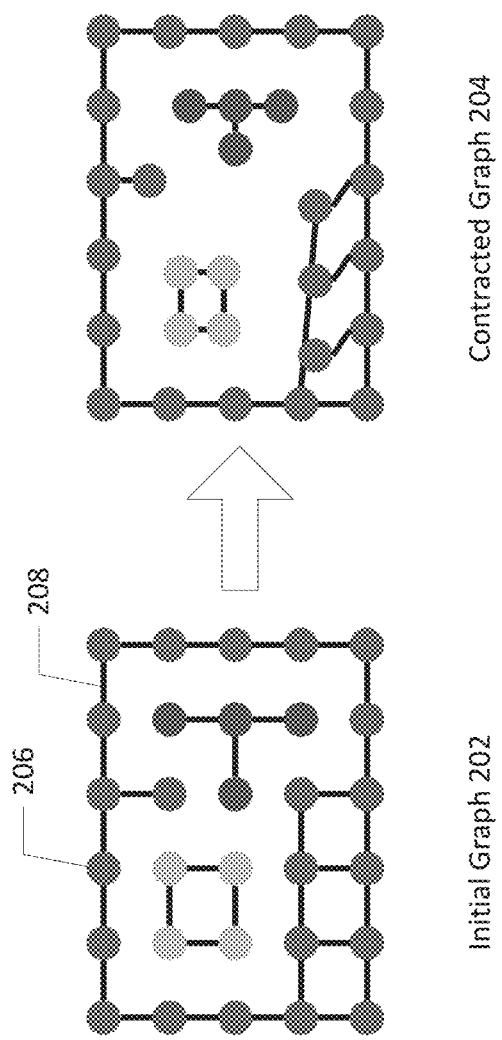
FIG. 2 illustrates an exemplary contraction process based on a pixel-level graph, according to an embodiment.

FIG. 2 illustrates an exemplary local contraction process, according to an embodiment. In FIG. 2, the input image in input data 112 is represented by an initial graph 202, in which each vertex 206 represents an image pixel with its color value, and each edge 208 represents an affinity relationship between a pair of adjacent pixels. Application of the contraction process to initial graph 202 results in contracted graph 204, in which pixels with relatively high affinity values are contracted towards each other.

Figure 3:
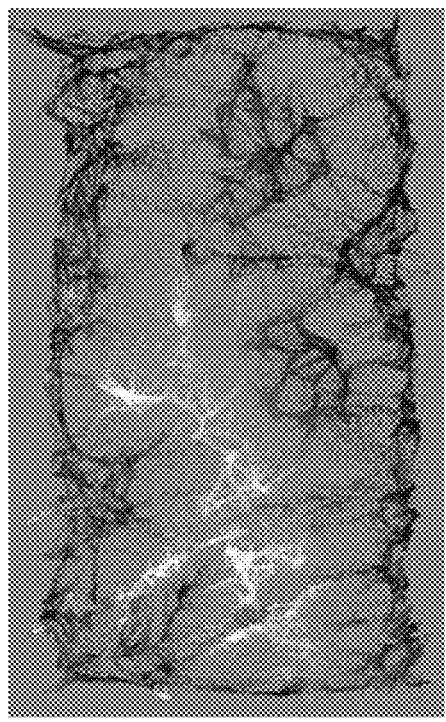
FIG. 3 illustrates results of the contraction process when applied to an exemplary input image, according to an embodiment.
Figure 3:
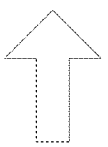
Figure 3:
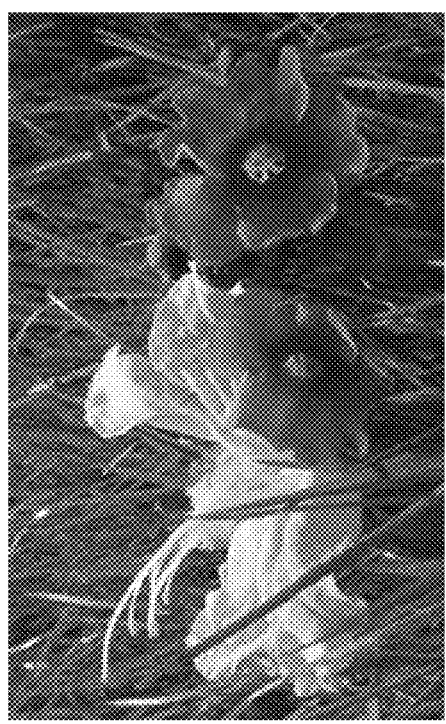

FIG. 3 shows an exemplary input image 302 and a contracted image 304 after the local contraction process. It can be seen that pixels with similar appearance converge toward each other after the contraction process, while pixels with dissimilar appearance tend to move apart from each other.

Figure 4:
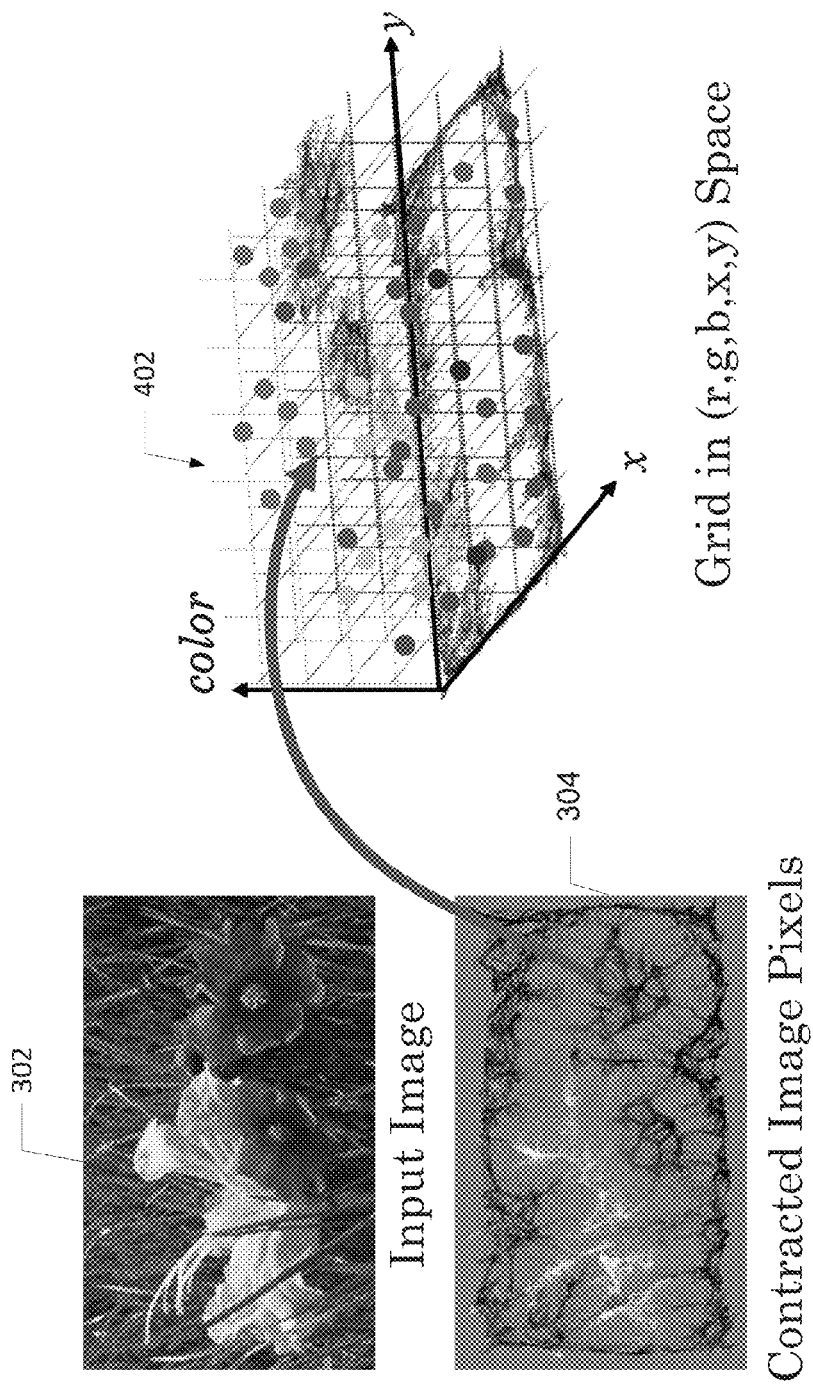
FIG. 4 illustrates a pixel-to-cell mapping process based on a feature space, according to an embodiment.

After the contraction process, the contracted image pixels are merged or condensed into multiple cells. Here, a five-dimensional feature space W is defined, based on the contracted spatial coordinates $(\tilde{x}, \tilde{y})$ and the RGB color values $(I^R, I^G, I^B)$. FIG. 4 shows an exemplary embodiment 402 of the five-dimensional feature space W. For ease of illustration, the color coordinates are combined in feature space 402 to show a three-dimensional representation thereof. A feature vector is defined for each contracted image pixel of contracted image 304 of input image 302 (FIG. 3) in feature space 402. In feature space 402, spatially neighboring pixels with different colors are pulled away from each other and are less likely to get blended together.

According to an embodiment, the merging or condensation of image pixels into cells is represented as a pixel-to-cell mapping process. A pixel i with contracted coordinates $(\tilde{x}, \tilde{y})$ and RGB values $(I^R, I^G, I^B)$ is mapped to a cell with an index $([\tilde{x}_i \times b_s], [\tilde{y}_i \times b_s], [I_i^R \times b_c], [I_i^G \times b_c], [I_i^B \times b_c])$. Here, the symbol "[ ]" represents a rounding operation, $b_s$ represents a number of spatial sampling bins, and $b_c$ represents a number of color sampling bins.

The pixel-to-cell mapping of the whole contracted image is recorded in an N×P binary matrix M, where N and P denote the total number of image pixels and cells, respectively. Here, if the $i^{th}$ pixel is mapped to the $j^{th}$ cell, then M(i,j)=1, and M(i, k)=0 for all k≠j.

In one embodiment, parameters $b_s$ and $b_c$ are set to 15 so that the number of cells P is about 10,000 to 20,000. In other embodiments, parameters $b_s$ and $b_c$ may be set to any values between 10 and 20. In still other embodiments, parameters $b_s$ and $b_c$ may be set to any other values as appropriate.

Multi-Scale Affinity and Cell-Level Graph

After the image pixels are merged into cells by pixel processing module 102, the cells are output to cell processing module 104, which determines a cell affinity value between each pair of cells in order to construct a cell-level graph model. In an embodiment, cell processing module 104 applies a multi-scale or multi-resolution approach to determine the affinity information from an image pyramid. The multi-scale cell-level graph model is further described below.

Figure 5A:
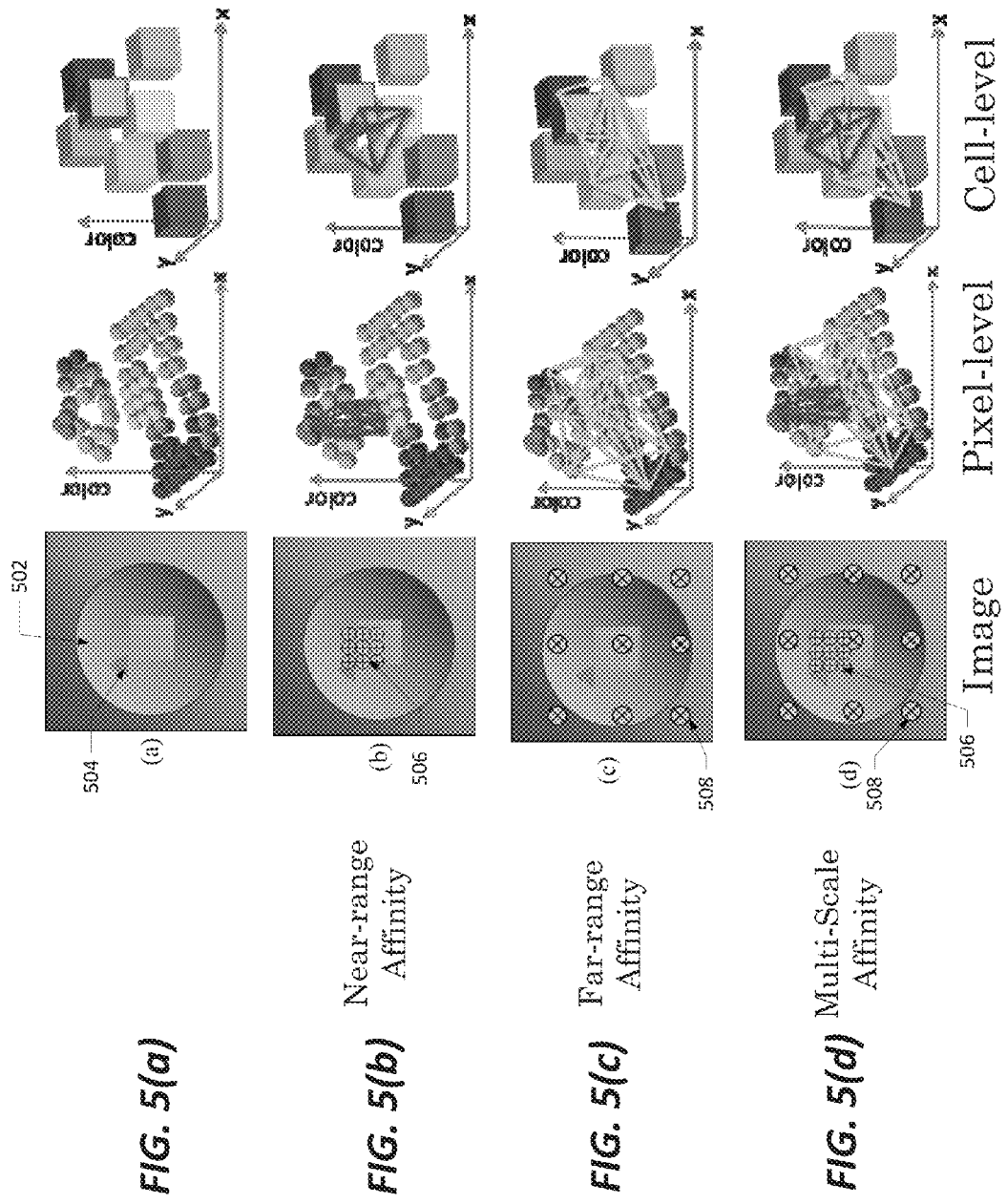

FIGS. 5(a)-5(d) illustrate exemplary embodiments of fixed-resolution scheme and multi-resolution scheme celled-level graph modeling. The schemes enable determining the affinity value between cells at different spatial ranges. The left image of FIG. 5(a) shows an image of an artificial scene that contains a circular object 502 with a square hole, and a small triangular object 504. The middle and right images of FIG. 5(a) illustrate the corresponding feature distributions at the pixel level and the cell level, respectively. Here, circles represent individual pixels, and cubes represent individual cells.

FIGS. 5(b) and 5(c) illustrate different embodiments that use different local windows each including 3×3 sampling pixels to explore the affinity information around an image pixel. Here, each "⊕" symbol represents a sampling pixel. The local window in the left image of FIG. 5(b) covers a relatively small spatial region including only immediately adjacent pixels, while the local window in the left image of FIG. 5(c) covers a relatively large spatial region including more distant pixels.

Based on Equation (2), the affinity value for each pair of the nine sampling pixels is determined. The middle image of FIG. 5(b) shows the corresponding coverage of pixel pairs in the feature space. In this case, only the affinity values of adjacent sampling pixels are determined. A far-range affinity, such as the affinity between the pixels within the hole and the pixels outside circular object 502, is not calculated. In contrast, in the embodiment of FIG. 2(c), the affinity among distant sampling pixels is calculated, while some details may be lost, such as the relationship between triangular object 504 and circular object 502.

The right images of FIGS. 5(b) and 5(c) show the affinity among the cells after the image pixels are merged. Similarly, the small-scale sampling window provides a near-range affinity among the cells, while the large-scale sampling window provides the far-range affinity among the cells.

To explore the affinity for both near and far ranges, the embodiment of FIG. 5(d) uses the multi-scale approach, where both a small-scale window and a large-scale window are used to sample the input image. It can be seen from the right image of FIG. 5(d), both the near-range and far-range affinity information among cells is determined based on the multi-scale sampling scheme. In addition, at the cell level, a lot of redundant affinity computations can be saved as compared to the pixel-level affinity estimation.

Figure 6:
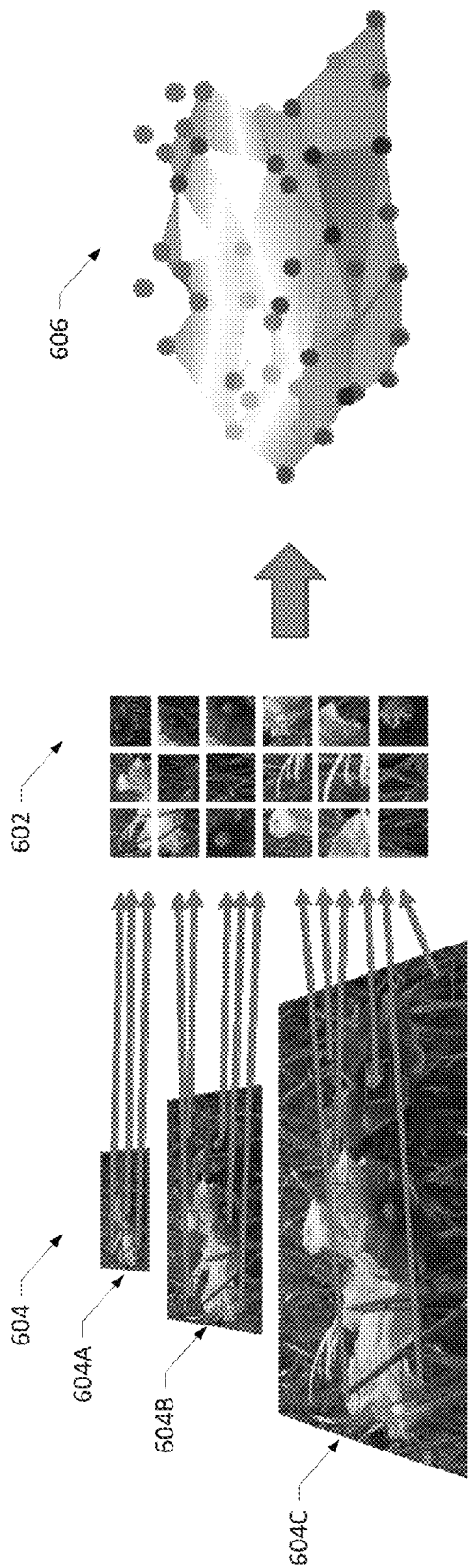
FIG. 6 illustrates cell-level processing based on multi-resolution image patches, according to an embodiment.

According to a further embodiment, the multi-scale affinity estimation is implemented by computing affinity over a set of multi-resolution image patches. FIG. 6 illustrates cell-level processing based on multi-resolution image patches, according to an embodiment. For example, multi-resolution image patches 602 are sampled from a Gaussian image pyramid 604. Here, image pyramid 604 may be generated by module 104 from input image 302 by recursively performing a down-sampling process with a sampling rate $d_s$, along both x and y-axes. Resulting image pyramid 604 includes a coarsest image 604A, one or more intermediate-resolution images 604B, and a finest image 604C, which is input image 302. From each of the images 604A-604C in image pyramid 604, a sliding window is used to extract image patches.

For the image patches, such as image patches 602, module 104 applies a local affinity learning process to estimate the affinity values among cells. At the coarsest level (i.e., image 604A), the estimation of the affinity information is similar to the far-range case illustrated in FIG. 5(c), in which some details of the affinity information may be missing. However, as module 104 gradually scans the images from the low resolution images to high resolution images, more and more details of affinity information are obtained. In general, most affinity information can be extracted from the low-resolution images, while only a small percentage of detailed affinity information is extracted from the high-resolution images. Hence, in one embodiment, the image patches from the lowest-resolution image (i.e., the coarsest image 604A) are completely scanned by sliding windows, while only a subset of the image patches from the higher-resolution images (i.e., images 604B and 604C) are scanned, to determine the cell-level affinity information.

For the sampling of image patches in the higher-resolution images (i.e., images 604B and 604C), module 104 may adopt a residual-based scheme to compensate for the missing details caused by the down-sampling process. More particularly, module 104 maps individual low-resolution pixels and high-resolution pixels into grid cells to form two sets of cells. The difference between these two sets of cells indicates the missing information after the down sampling process. Based on residual cells, module 104 identifies the corresponding pixels and places sampling patches around these pixels. More particular, for the pixels which are mapped into the residual cells, a set of r×r windows centered at each of the pixels are placed on the high-resolution images to obtain high-resolution sampling patches. In addition, a set of sliding windows are placed on the low-resolution image to obtain low-resolution sampling patches. Cell-level affinity information is then computed from the sampling patches.

Based on the cell-level affinity information, module 104 generates a cell-level graph 606 as shown in FIG. 6. To construct cell-level graph 606, it is assumed that Ω represents the set of cells in the cell-level graph, which contains P cells in total. The alpha matte values of these P cells are represented by a P×1 vector $\alpha=[\alpha_1, \alpha_2, \ldots, \alpha_P]^T$, where $\alpha_k$ denotes the alpha value of the $k^{th}$ cell.

In addition, it is assumed that the alpha matte values of the pixels within a local image patch may be expressed as an affine transformation of the corresponding image features inside the image patch. The coefficients of the affine transformation are assumed to be constant for one image patch, but may be different across different patches. Since in the pixel-to-cell mapping, pixels mapped to the same cell typically share similar color appearance and spatial location, so that these pixels share similar alpha matte values. Hence, within a local image patch, it is assumed that the alpha matte values of the referred cells are expressed as an affine transformation of the corresponding image features. For an image patch $\omega_q$ of size r×r in the input image and centered at a pixel q, module 104 inspects the image pixels of the patch to determine the set of mapped cells $\Omega_q$, which is a subset of Ω. Here, Nq represents the number of cells in $\Omega_q$. Since some pixels in the patch $\omega_q$ may be mapped to the same cell, $N_q$ has a value between 1 and $r^2$. For a cell i in $\Omega_q$, $\phi_i=[r_i^k, g_i^k, b_i^k]^T$ represents its color feature, which is computed by, for example, averaging the RGB color values of all the related pixels of that cell. Within the local image patch, the alpha value of the cell i is estimated by an affine transformation of the feature vector $\phi_i$. That is, the alpha value of the cell i is calculated by:

$$\alpha_i = [\varphi_i^T \ 1] \begin{bmatrix} \beta \\ \beta_0 \end{bmatrix}, \qquad (9)$$

where $\beta=[\beta_r, \beta_g, \beta_b]^T$ and $\beta_0$ is a scalar. Since it is assumed that the affine transformation coefficients $\{\beta, \beta_0\}$ are locally constant, module 104 may further determine an affine model for the alpha matte values of all the cells in $\Omega_q$. Here, for the $k^{th}$ cell in $\Omega_q$, $\pi_k^q$ represents the corresponding index of this cell in Ω. Accordingly, an $N_q \times 1$ vector $$\alpha_q \equiv \begin{bmatrix} \alpha_{\pi_1^q}, \alpha_{\pi_2^q}, \ldots, \alpha_{\pi_{N_q}^q} \end{bmatrix}^T$$

represents the vector of alpha matte values of the $N_q$ cells in Ω, and $\Phi_q=[\tilde{\phi}_1^T, \ldots, \tilde{\phi}_{Nq}^T]^T$ represents a matrix stacked by $\tilde{\phi}_i=[\phi_i^T \ 1]$. Based on the above notations, the alpha matte prediction for all the cells within image patch $\omega_q$ can be expressed as:

$$\alpha_q = \Phi_q \begin{bmatrix} \beta \\ \beta_0 \end{bmatrix}. \qquad (10)$$

Equation (10) relates the alpha matte values of all the cells in Q, with the corresponding image features. If it is assumed that both $\alpha_q$ and $\Phi_q$, are given, then the optimal $\beta$ and $\beta_0$ can be derived by minimizing the following quadratic cost function $E(\beta, \beta_0)$:

$$E(\beta, \beta_0) = \left\| \alpha_q - \Phi_q \begin{bmatrix} \beta \\ \beta_0 \end{bmatrix} \right\|^2 + c_\beta \beta^T \beta, \qquad (11)$$

where $c_\beta$ is a parameter for regularization. For the cost function $E(\beta, \beta_0)$ in (11), the optimal solutions of $\beta$ and $\beta_0$ are given by:

$$\begin{bmatrix} \beta \\ \beta_0 \end{bmatrix} = (\Phi_q^T \Phi_q + c_\beta D_\beta)^{-1} \Phi_q^T \alpha_q. \qquad (12)$$

In equation (12), $$D_\beta = \begin{bmatrix} I_3 & 0 \\ 0 & 0 \end{bmatrix}$$

is a 4×4 matrix, in which $I_3$ is a 3×3 identity matrix. By substituting equation (12) into equation (10), a local constraint over $\alpha_q$ can be formulated as $$\alpha_q = W_q^T \alpha_q, \qquad (13)$$

where $w_q = \Phi_q(\Phi_q^T \Phi_q + c_\beta D_\beta)^{-1} \Phi_q^T$. In equation (13), $W_q$ is an $N_q \times N_q$ transformation matrix. In equation (13), each entry of $\alpha_q$ on the left side is expressed as a linear combination of the entries of $\alpha_q$ on the right side. This means that, the alpha matte value of each cell in $\Omega_q$, may be expressed as a linear combination of the alpha values of the cells in $\Omega_q$. This local constraint over $\alpha_q$ is further formulated as a squared error cost function $J_q$ with respect to $\alpha_q$:

$$\begin{aligned} J_q(\alpha_q) &= \|\alpha_q - W_q^T \alpha_q\|^2 \\ &= \alpha_q^T (I_q - W_q)(I_q - W_q)^T \alpha_q \\ &= \alpha_q^T L_q \alpha_q. \end{aligned} \qquad (14)$$

In equation (14), $I_q$ is the $N_q \times N_q$ identity matrix. The local Laplacian matrix for the cells in $\Omega_q$ is an $N_q \times N_q$ matrix defined as:

$$L_q = (I_q - W_q)(I_q - W_q)^T. \qquad (15)$$

It is assumed that a graph $\Gamma_q$ is defined, in which the vertices represent the cells in $\Omega_q$ and the edge between a pair of vertices represents the affinity relationship between the corresponding cell pair. For $\Gamma_q$ its corresponding graph Laplacian matrix is defined as:

$$L_q = D_q - A_q, \quad (16)$$

where $D_q$ is the degree matrix and $A_q$ is the affinity matrix. The entry $A_q(i,j)$ represents the affinity value between the cells i and j, while the degree matrix $D_q$ is a diagonal matrix with its diagonal terms being defined as:

$$D_q(i, i) = \sum_{j=1}^{N_q} A_q(i, j). \quad (17)$$

According to an embodiment, the affinity matrix for the cell-level graph is not explicitly defined. Instead, the affinity information is derived based on the local learning scheme expressed in equation (14). Furthermore, the cost function $J_q$ in equation (14) can also be interpreted as $$J_q(\alpha_q) = \alpha_q^T L_q \alpha_q \quad (18)$$
$$= \sum_{i=1}^{N_q} \sum_{j=1}^{N_q} \frac{1}{2} A_q(i, j) \|\alpha_i - \alpha_j\|^2,$$

where $\alpha_i$ and $\alpha_j$ represent the $i^{th}$ and $j^{th}$ elements of the vector $\alpha_q$, respectively.

After determining the local Laplacian matrix based on the cost function $J_q$ defined in equation (14) within a single image patch $\omega_q$, module 104 further determines a global cost function by integrating the local cost functions over a whole patch set $S_{patch}$. Here, the cost function $J_q$ in equation (14) may be rewritten as $$J_q(\alpha) = \alpha^T L'_q \alpha. \quad (19)$$

In equation (19), $\alpha \equiv [\alpha_1, \alpha_2, \ldots, \alpha_P]^T$, and $L'_q$ denotes a P×P local Laplacian matrix, whose entries for the pairs of cells in $\Omega_q$ are equal to the corresponding ones in $L_q$, while the remaining entries are set to zero. Based on equation (19), a global cost function J is defined as a weighted sum of $J_q(\alpha)$ based on a weighting function $w(l_q)$. That is:

$$J(\alpha) = \sum_{q \in \Omega} w(l_q)(\alpha^T L'_q \alpha). \quad (20)$$

The weighting function $w(l_q)$ in equation (20) reflects the importance of each patch according to the corresponding image level in the pyramid. Here, $l_q$ denotes the level index. In image pyramid 604, the number of pixels in the jth level is $(d_s^2)^{j-1}$ times smaller than that of the original image after being scaled down (j−1) times in both x and y directions with the down-sampling rate $d_s$. By assuming that each pixel in the jth-level image is $(d_s^2)^{j-1}$ times more important than that of the original image pixel, the weighting function $w(l_q)$ is defined as $$w(l_q) = (d_s^2)^{l_q - 1}. \quad (21)$$

Moreover, equation (20) may be rewritten in a more compact form as:

$$J(\alpha) = \alpha^T L \alpha, \quad (22)$$
where
$$L = \sum_{q \in \Omega} w(l_q) L'_q. \quad (23)$$

L in equation (22) is called the cell-level matting Laplacian (CML) matrix for the cell-level graph. Since the CML generated according to equation (23) is an unnormalized Laplacian matrix, it is normalized before spectral clustering in order to avoid unbalanced clustering. In one embodiment, module 104 may apply a symmetric normalization to the CML, which modifies the affinity value between each pair of cells based on a degree matrix of the cells. The normalized CML $\bar{L}$ is defined to be:

$$\bar{L} = D^{-1/2} L D^{-1/2}. \quad (24)$$

In equation (24), the diagonal matrix D represents the P×P degree matrix of the CML.

Component-Level Graph

Figure 7:
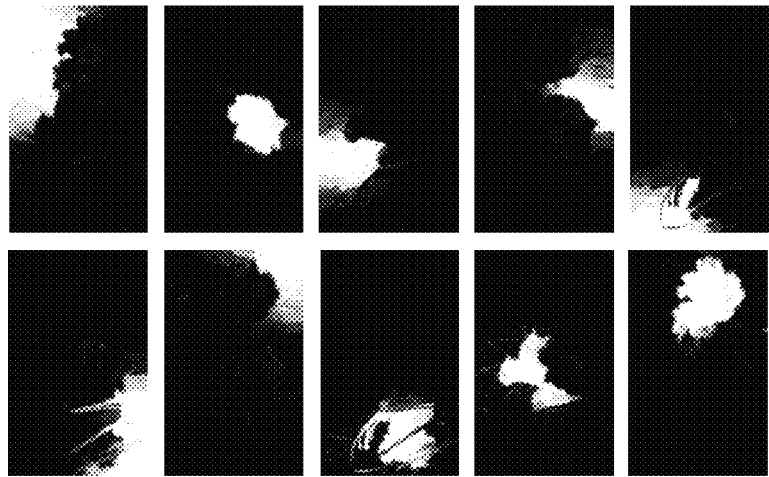
FIG. 7 illustrates a cell-to-component mapping, according to an embodiment.
Figure 7:
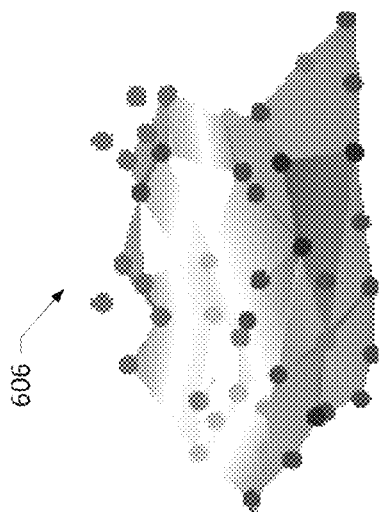

FIG. 7 illustrates a cell-to-component mapping, according to an embodiment. After module 104 obtains cell-level graph 606 as shown in FIG. 6, cell-level graph 606 is output to module 106, which decomposes it into a set of matting components 702, as shown in FIG. 7, and forms a component-level graph for the estimation of foreground mattes. During the construction of the component-level graph, some prior information about the foreground model may be included.

Figure 8:
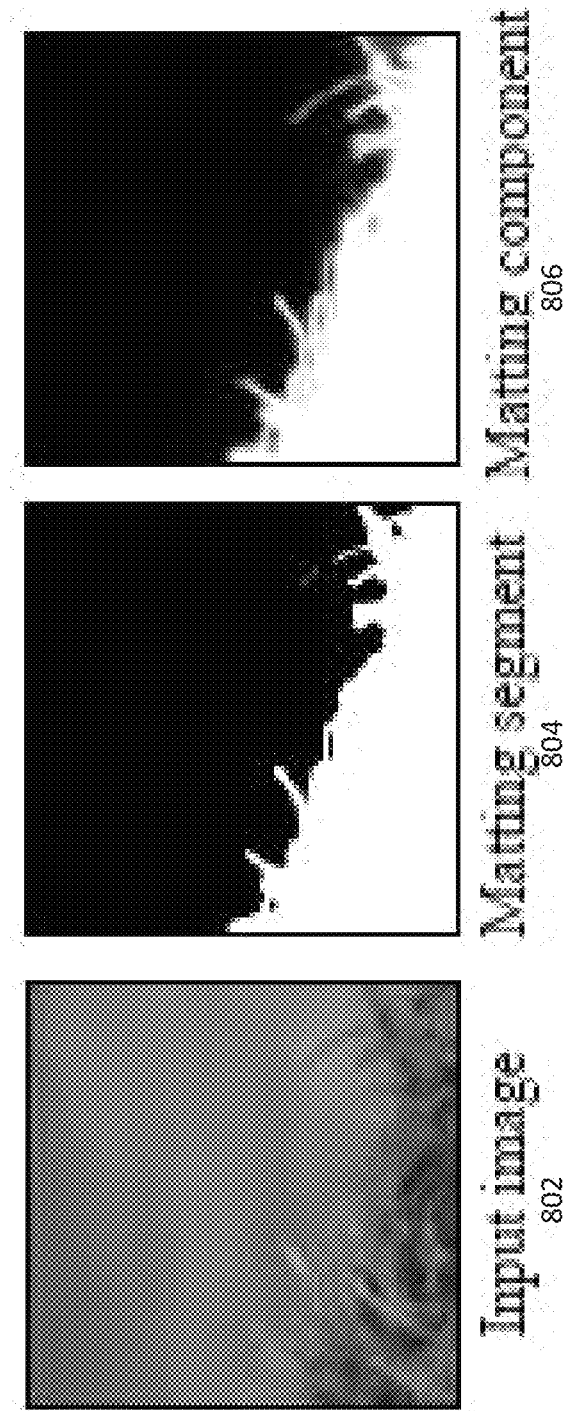
FIG. 8 illustrates exemplary embodiments of an input image, a matting segment, and a matting component.

To decompose cell-level graph 606 into matting components 702 as shown in FIG. 7, module 106 performs spectral clustering to generate hard-decision matting segments and then applies an optimization process to transform or refine the hard-decision matting segments into soft-decision matting components. FIG. 8 illustrates exemplary embodiments of an input image 802, a matting segment 804, and a matting component 806 generated by module 106.

For the spectral clustering, module 106 transforms the cell-level data to a higher-dimensional space, in which the cell-level data points with high affinity tend to share similar coordinates, and then performs clustering in the higher-dimensional space. More particularly, module 106 first generates a P×S matrix E based on S normalized eigenvectors, $e^1, \ldots, e^S$, corresponding to the S smallest eigenvalues of the P×P cell-level Laplacian matrix $\bar{L}$ discussed above. In the matrix E, the $i^{th}$ row vector represents the coordinates of the $i^{th}$ cell in $\Omega$ in a space spanned by the S eigenvectors. By performing k-means clustering over the row vectors of E, module 106 clusters the P cells into K different clusters. The K clusters of cells are treated as the initial matting segments, such as matting segment 804 shown in FIG. 8. In one embodiment, module 106 uses K binary vectors $c^k$ of size P×1 to represent the hard-decision clustering result, where $1 \leq k \leq K$. If the $k^{th}$ cluster contains the $i^{th}$ cell of $\Omega$, module 106 sets the $i^{th}$ element of $c^k$ to 1; otherwise, the $i^{th}$ element of $c^k$ is set to 0.

To transform the hard-decision matting segments into soft-decision matting components, such as matting component 806 shown in FIG. 8, module 106 applies a global optimization process based on the cost function in equation (22). Here, module 106 organizes each matting component as an assembly of cells and represents the alpha matte information of a component k in terms of a P×1 alpha matte $\alpha^k \equiv [\alpha_1^k, \alpha_2^k, \ldots, \alpha_P^k]^T$. The $i^{th}$ element of $\alpha^k$ indicates a soft membership that the $i^{th}$ cell belongs to the $k^{th}$ component. Based on the assumption that the soft-decision matting components do not deviate too much from the hard-decision matting segments, the alpha matte vector $\alpha^k$ corresponding to the $k^{th}$ matting component is obtained by minimizing the following equation:

$$J(\alpha^k) = (\alpha^k)^T L(\alpha^k) + \lambda_c (\alpha^k - c^k)^T (\alpha^k - c^k), \quad (25)$$

where $\lambda_c$ is a constant to control the trade-off between the matting Laplacian cost and the deviation from the matting segments. Based on equation (25), module 106 determines the optimal $\alpha^k$ by solving the following sparse system of linear equations:

$$(L+\lambda_c I_c)\alpha^k = \lambda_c c^k, \quad (26)$$

where $I_c$ denotes the P×P identity matrix. It can be seen from FIG. 8 that more detailed matting values are obtained in matting component 806 than in initial matting segment 804.

After the matting components are determined, module 106 generates a component-level graph. Module 106 generates the component-level graph by condensing the cell-level graph or according to a divergence-based process. In one embodiment, module 106 generates the component-level graph by further condensing the cell-level matting Laplacian matrix $\overline{L}$ into a component-level matting Laplacian $L_{condensed}$. Here, it is assumed that $T=[\alpha^1, \ldots, \alpha^K]$ represents a P×K matrix formed by the alpha matte vectors of the K matting components, which is used to calculate the component-level matting Laplacian $L_{condensed}$ as follows:

$$L_{condensed} = T^T \overline{L} T. \quad (27)$$

Since the cell-level matting Laplacian $\overline{L}$ is constructed based on the multi-resolution local affinity learning process described above, the lack of knowledge between spatially isolated components may become a barrier to handle more complicated scenes. To better model the spatial relationship between distant components, module 106 can use a divergence-based graph, according to another embodiment. Module 106 constructs the divergence-based graph by explicitly estimating the affinity value between every component pair, as described hereinafter.

For each pairing of components, module 106 measures the Kullback-Leibler (KL) divergence between the color distributions of the two components. For the matting component k, module 106 uses a Z×1 vector $h^k=[h_1^k, \ldots, h_Z^k]^T$ to represent its color distribution, where Z is the number of color bins. Here, $h_i^k$ represents the probability value in the $i^{th}$ bin. Module 106 then group cells with similar color values into a color bin. For the $i^{th}$ color bin of the $k^{th}$ matting component, module 106 uses $p_i$ to represent the set of cells belonging to this bin. Accordingly, $h_i^k$ is determined as follows:

$$h_i^k = \frac{1}{N^k} \sum_{j \in \rho_i} \alpha_j^k N_j, \quad (28)$$

where $$N^k = \sum_{j=1}^{P} \alpha_j^k N_j$$

is the normalization term. In equation (28), $N_j$ is the number of pixels in cell j, and $\alpha_j^k$ is the alpha value of the cell j for the $k^{th}$ matting component. Based on the above definitions, the KL divergence between the two matting components m and n is defined as:

$$v_{KL}(m,n) = \frac{D_{KL}(h^m \| h^n) + D_{KL}(h^n \| h^m)}{2}, \quad (29)$$

where $D_{KL}$ is a diagonal degree matrix and defined as:

$$D_{KL}(p\|q) = \sum_i p(i) \log\left(\frac{p(i)}{q(i)}\right).$$

For any pair of components, a high divergence value corresponds to a low affinity value. Hence, module 106 uses a sigmoid function $\sigma(x)=1/(1+\exp(-x))$ to define an affinity $A_{KL}(m,n)$ between components m and n as:

$$A_{KL}(m,n) = \sigma(\overline{v}_{KL} - v_{KL}(m,n)) \quad (30)$$

In equation (30), $\overline{v}_{KL}$ represents the mean of the KL divergence values over all component pairs. After having obtained the K×K divergence-based affinity matrix $A_{KL}$, the diagonal degree matrix $D_{KL}$ is computed as:

$$D_{KL}(i,i) = \sum_{j=1}^{K} A_{KL}(i,j). \quad (31)$$

Finally, the divergence-based Laplacian matrix $L_{KL}$ is calculated as:

$$L_{KL} = D_{KL} - A_{KL}. \quad (32)$$

Module 106 then combines the divergence-based Laplacian $L_{KL}$ with the condensed matting Laplacian $L_{condensed}$ to calculate the component-level graph Laplacian $L_{comp}$:

$$L_{comp} = L_{condensed} + \lambda_{KL} L_{KL}. \quad (33)$$

In equation (33), $\lambda_{KL}$ is a parameter to balance the contribution between $L_{condensed}$ and $L_{KL}$. Module 106 calculates $\lambda_{KL}$ based on the ratio between the sum of the condensed matting affinity degrees and the sum of the KL affinity degrees as follows:

$$\lambda_{KL} = \sum_{i=1}^{K} L_{condensed}(i,i) \bigg/ \sum_{i=1}^{K} L_{KL}(i,i). \quad (34)$$

Figure 9:
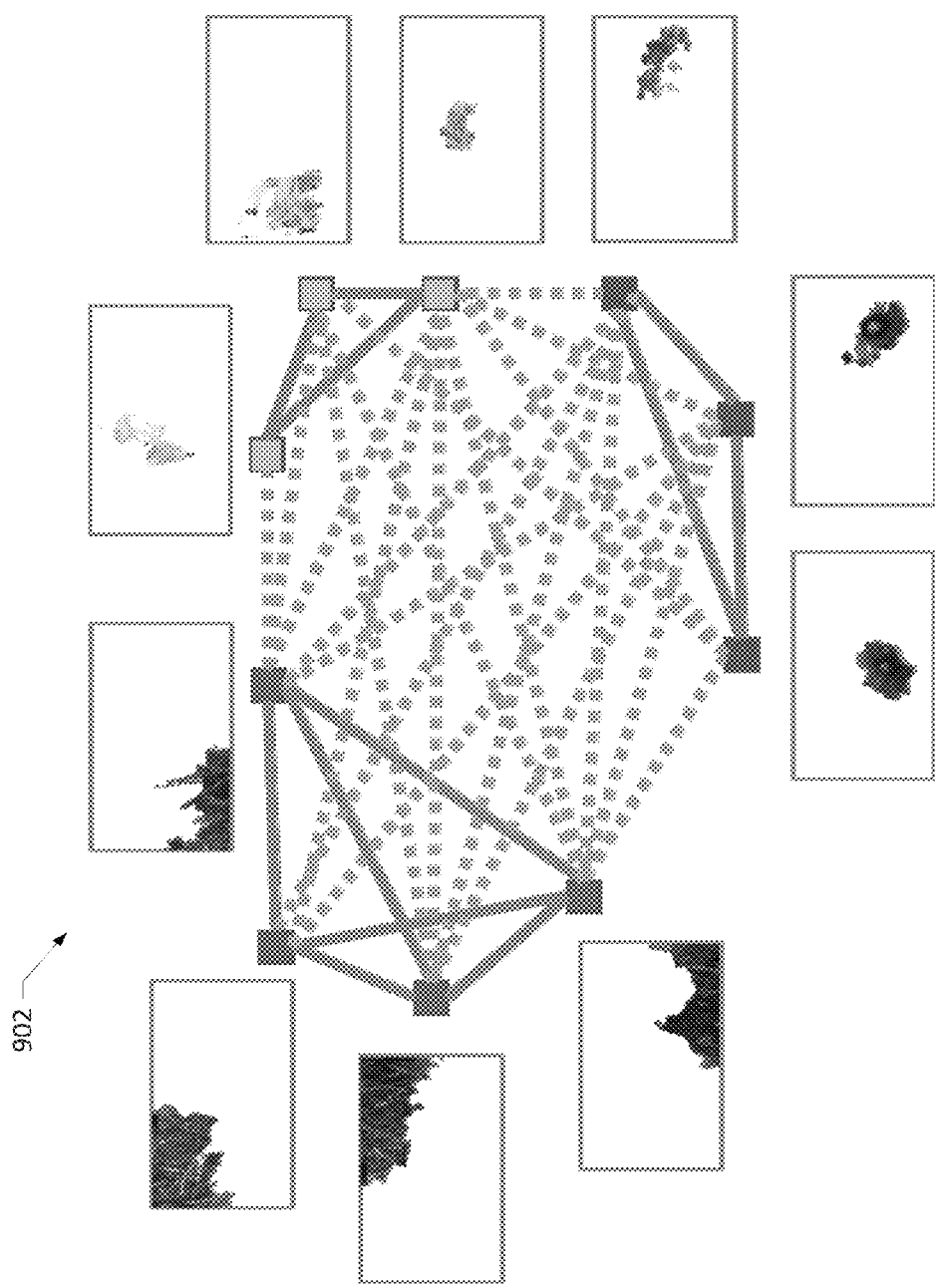
FIG. 9 illustrates an exemplary embodiment of a component-level graph.

FIG. 9 illustrates an exemplary component-level graph 902 generated by module 106 based on matting components 702 of FIG. 7.

Component-to-Layer Mapping

Figure 10:
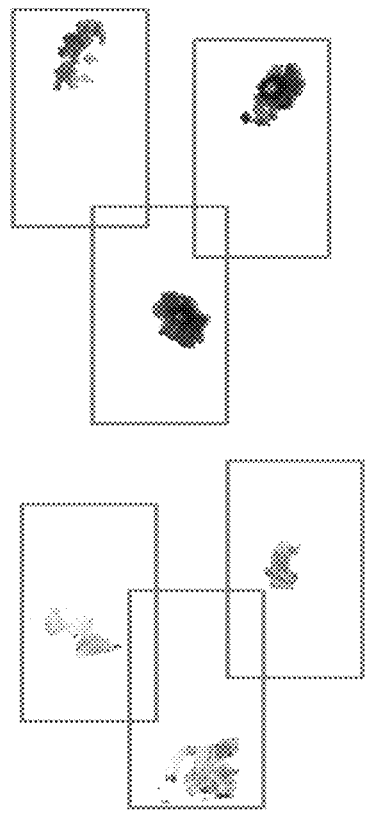
FIG. 10 illustrates a component-to-layer mapping, according to an embodiment.
Figure 10:
Figure 10:
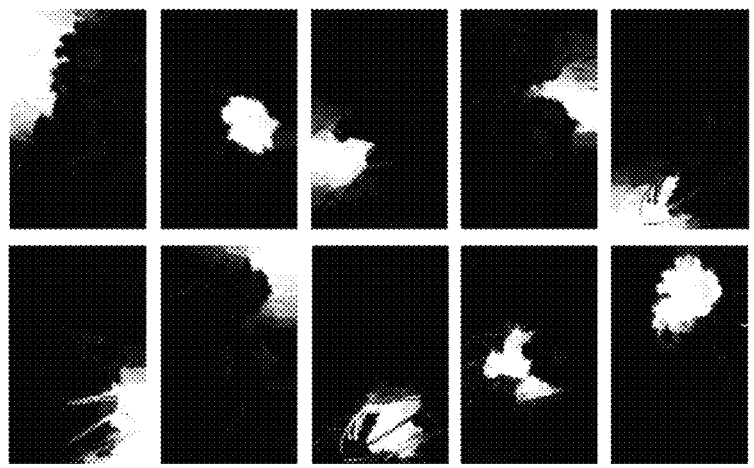

According to an embodiment, after module 106 calculates the component-level matting Laplacian $L_{comp}$ as discussed above, layer processing module 108 receives the data and applies a component-to-layer mapping procedure based on component-level spectral clustering. FIG. 10 illustrates an exemplary embodiment of the component-to-layer mapping procedure, in which matting components shown in FIG. 7 are mapped to a plurality of layers 1002 based on component level graph 902.

Similar to the cell-to-component mapping described above, the component-to layer mapping may also be performed based on spectral clustering. Here, module 108 generates a component-level matrix $E_{comp}$ based on normalized eigenvectors, $e_{comp}^1, \ldots, e_{comp}^K$ of the K×K component-level Laplacian matrix $L_{comp}$. By performing k-means clustering over the row vectors of $E_{comp}$, module 108 clusters the K matting components into Q clusters, where Q is an integer ranging from 2 to K and may be determined according to user input. Module 108 then uses a plurality of K×1 binary vectors $d^q$, where $1 \leq q \leq Q$, to represent the clustering result. If the $q^{th}$ cluster contains the $i^{th}$ matting component, module 108 sets the $i^{th}$ element of $d^q$ to 1; otherwise, the $i^{th}$ element of $d^q$ is set to 0. Based on $d^q$, module 108 represents the alpha matte information of the $q^{th}$ matting layer using a P×1 vector $\alpha_{layer}^q$, which is defined as:

$$\alpha_{layer}^q = [\alpha^1 \ldots \alpha^K] d^q. \quad (35)$$

Figure 11A:
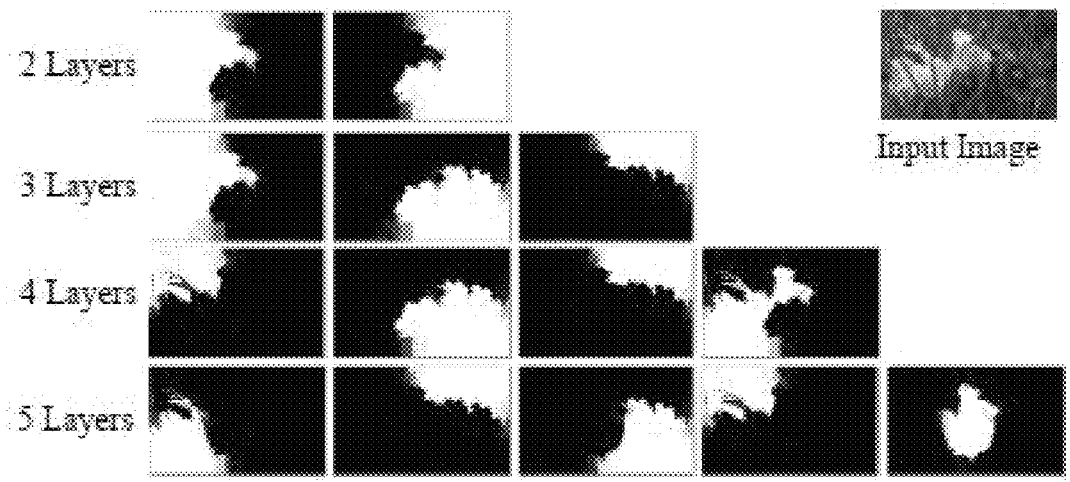
FIG. 11A illustrates matting results based on a direct mapping from cells to layers, according to an embodiment.
Figure 11B:
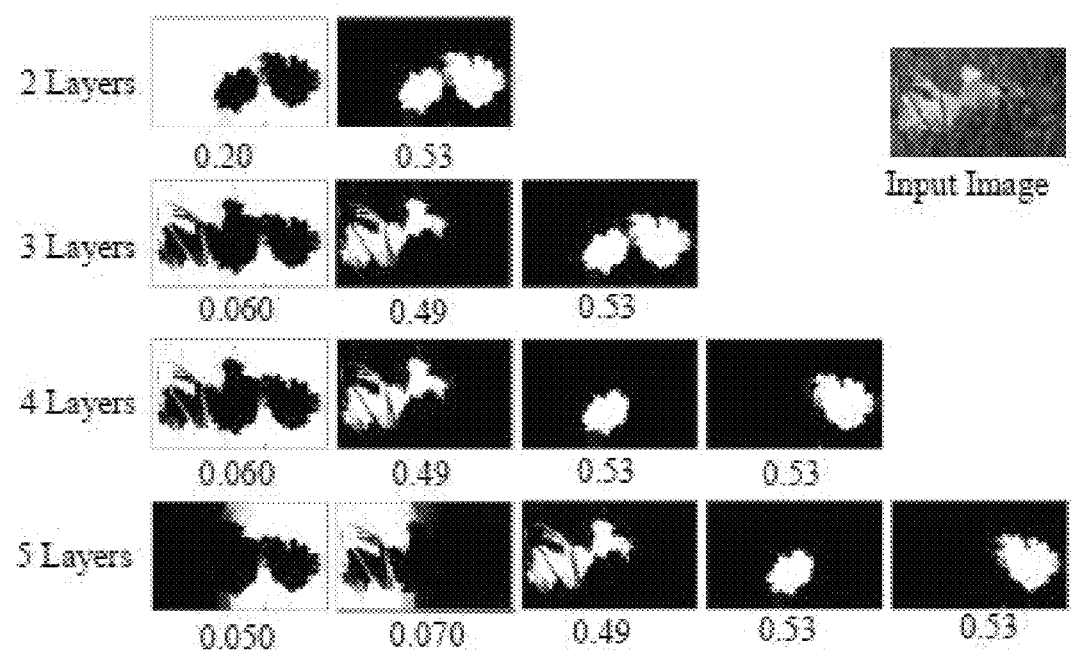
FIG. 11B illustrates matting results based on a multi-resolution mapping from cells to components and then to layers, according to an embodiment.

By using the cell-to-component mapping and the component-to-layer mapping, system 100 performs spectral clustering twice on the image data, instead of directly clustering cells into matting layers. In particular, system 100 first clusters cells into components and then clusters components into layers. Based on the cell-level graph, such as graph 606 shown in FIG. 6, system 100 computes the affinity values of the graph vertices locally based on the multi-resolution local affinity learning scheme, to explore the affinity information in short ranges. On the other hand, based on the component-level graph, such as graph 902 of FIG. 9, system 100 calculates the affinity value between each pair of components and generates a fully connected graph including both near-range and far-range affinity information. Based on this fully connected graph, system 100 explores the affinity information on a more global scale as compared to the cell-level analysis alone. FIG. 11A illustrates matting results based on a direct mapping from cells to layers, according to an embodiment. In FIG. 11A, the cells are directly clustered into two, three, four, and five layers. As a comparison, FIG. 11B illustrates matting results based on a multi-resolution mapping from cells to components and then to layers, according to an embodiment. In FIG. 11B, the two-stage clustering is applied to the cells by first decomposing the cells into components and then clustering the components into layers. By decomposing an image into a larger number of components first, followed by the component-to-layer mapping, system 100 obtains much more reasonable results.

According to another embodiment, system 100 applies a cell-to-pixel mapping to convert the cell-level information $\alpha^k$ back to the pixel domain. For any pixel i, if j denotes the corresponding cell, then $\mu(j)$ denotes the set of cells within a neighborhood of j. The pixel-level data $o_i^{pixel}$ of the pixel i is interpolated by using the cell-level data values $o_k^{cell}$ of the cells in $\mu(j)$ based on the following formula:

$$o_i^{pixel} = \sum_{k \in \mu(i)} o_k^{cell} \cdot p_{k|i}, \quad (36)$$

where $$p_{k|i} = \left\{ \sum_{k \in \mu(j)} \exp\left(-\frac{\|f_i - f_k\|^2}{\sigma_f}\right) \right\}^{-1} \exp\left(-\frac{\|f_i - f_k\|^2}{\sigma_f}\right). \quad (37)$$

In equation (37), $p_{k|i}$ is a conditional probability and $f_i$ denotes the image feature of the pixel i in the five-dimensional feature space W defined by the deformed spatial coordinates ($\tilde{x}$, $\tilde{y}$) and the RGB color values ($I^R$, $I^G$, $I^B$), as described above. On the other hand, $f_k$ denotes the average of the feature vectors related to the cell k. The conditional probability in equation (37) models how likely the pixel i belongs to the cell k, based on the distance between $f_i$ and $f_k$ in the feature space. For example, a shorter distance indicates a higher probability.

Foreground Estimation

After module 108 generates the matting layers, module 110 receives the matting layers and applies a probabilistic estimation process to the matting layers to estimate foreground information. Here, module 110 processes each matting layer in terms of associated matting components and applies a probabilistic scheme to estimate, for each matting component, the probability of being a portion of the foreground objects.

More particularly, module 110 generates a probability distribution model $p(b) = p(b_1, \ldots, b_K)$, where $b_k \in \{0,1\}$ for $1 \leq k \leq K$. For the matting component k, module 110 sets $b_k = 1$ when this component is identified as a foreground component; otherwise, $b_k = 0$. Based on the above definitions, each vector b represents a foreground matte hypothesis and corresponds to an assembly of matting components. Once module 110 derives the probability distribution model p(b) for all possible b's, module 110 selects a subset of b's that is more likely to represent a foreground matte.

According to one embodiment, the distribution model p(b) is based on a consistency assumption that a pair of components with relatively high affinity tends to share the same foreground index. Thus, these two components tend to be either both foreground or both background. Using input image 302 in FIG. 3 as an example, it is assumed that the two flowers on the front are divided into two matting components. Once one of them is classified as a foreground component, while the other has a relatively high probability to also be a foreground component.

Based on this consistency assumption, module 110 evaluates a given vector b based on the component-level Laplacian matrix $L_{comp}$ to determine a measure of "inconsistency" defined as follows:

$$d_{fb}(b) = b^T L_{comp} b. \quad (38)$$

Based on the definition in equation (38), a vector b with a low value of inconsistency $d_{fb}(b)$ indicates that the corresponding assembly of matting components has a high probability to be a part of the foreground matte. However, this does not imply that a proper foreground vector can thus be found simply based on this measure alone. One example is that a b vector whose entries are all ones (or all zeros) corresponds to zero inconsistency, may not be desired result.

According to another embodiment, in order to avoid the above problem, module 110 further applies a balancing weight based on the assumption that a ratio between the foreground area and the background area should not be overly unbalanced. A balancing weight $\eta(b)$ is defined as:

$$\eta(b) = \frac{1}{N_\alpha} + \frac{1}{N_{\bar{\alpha}}}, \quad (39)$$

where $$N_\alpha = \sum_{k=1}^{K} N^k b_k$$

and $$N_{\bar{\alpha}} = \sum_{k=1}^{K} N^k (1 - b_k)$$

denote the sum of matting values in the foreground area and the background area, respectively. The term $N^k$ is defined above in equation (28). Under an unbalanced circumstance, one of $N_\alpha$ and $N_{\bar{\alpha}}$ is relatively small and thus the weight $\eta(b)$ becomes relatively large. By including this balancing weight η(b) into the inconsistency measure, module 110 calculates the inconsistency $d_{fb}(b)$ as follows:

$$d_{fb}(b)=\eta(b)(b^T L_{comp} b). \quad (40)$$

With this weighted inconsistency measure, the probability distribution model is defined as $$p_f(b) \propto \frac{1}{1+\exp(c(d_{fb}(b)-\overline{d_{fb}}))}, \quad (41)$$

where $$\overline{d_{fb}} = \sum_{\mathfrak{I}_f} d_{fb}(b).$$

In equation (41), $\mathfrak{I}_f$ is a set of foreground vectors, which have the smallest values of inconsistency $d_{fb}(b)$ over all feasible b's. In addition, $\overline{d_{fb}}$ is the mean of the inconsistency measures of the vectors in $\mathfrak{I}_f$ and the parameter c is a constant, which is empirically set to 0.02 or other appropriate values.

According to an embodiment, system 100 generates a relatively small number (typically about 10 to 20) of matting components for an input image. As a result, module 110 may generate all feasible vectors b's and check the corresponding $d_{fb}(b)$ for each vector b. According to another embodiment, module 110 may improve computational efficiency by ignoring b's that have relatively large values of $d_{fb}(b)$ and only focus on b's that have relatively small values of $d_{fb}(b)$.

Based on the formulation in equations (40) and (41), module 110 determines that, if a combination of matting components is consistent with respect to the component-level Laplacian matrix $L_{comp}$ and is balanced with respect to the remaining components, the corresponding $p_f(b)$ have a relatively large value. However, for any b and its complement (1-b), the values of $p_f(b)$ and $p_f(1-b)$ are actually equal. Thus, foreground and background mattes cannot be distinguished from each other simply based on the inconsistency measure in equation (40). According to a further embodiment, module 110 further evaluates a convexity of a matte and a convexity of its complement. Module 110 then identifies the foreground matte based on the assumption that a foreground matte usually tends to be convex. Here, the convexity is measured based on a ratio of the areas between a matte and its corresponding convex hull. By comparing the convexity between any pair of b and 1-b, module 110 eliminates the matting components with relatively low convexity.

Figure 12:
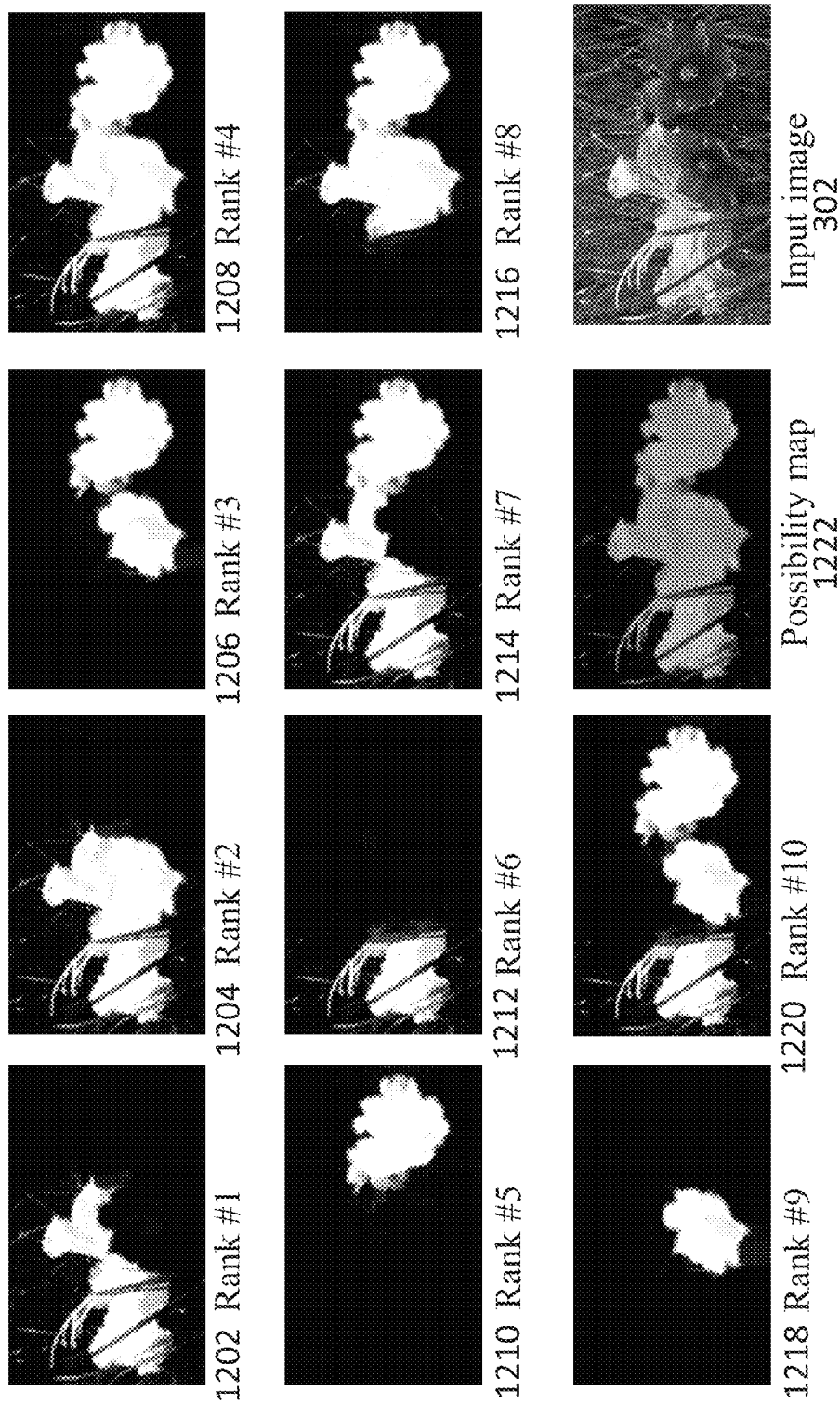
FIG. 12 illustrates exemplary embodiments of matting layers and a possibility map for a foreground region of an input image.

FIG. 12 illustrates exemplary embodiments of matting layers 1202-1220 and a possibility map 1222 for a foreground region of input image 302. Matting components 1202-1218 for input image 302 correspond to ten b's with the largest values of $p_f(b)$ (i.e., rank #1 to rank #10). It can be seen that these mattes typically have a large overlap with the foreground area, i.e., the flower regions. Hence, if ξ represents the set of leading foreground vectors with the largest values of $p_f(b)$, module 110 estimates the foreground vector $b_{FG}$ as the expectation of the b vectors in ξ as follows:

$$b_{FG} = \frac{\sum_{b \in \xi} p_f(b) b}{\sum_{b \in \xi} p_f(b)}. \quad (42)$$

Based on equation (42), module 110 calculates the foreground possibility map for the foreground matte as a weighted sum of the component-level alpha matte values as follows:

$$\alpha_{FG} = [\alpha^1 \ldots \alpha^K] \cdot b_{FG} \quad (43)$$

As shown FIG. 12, an exemplary possibility map 1222 reflects how likely an image pixel belongs to the foreground region of input image 302.

According to another embodiment, for the multiple layers generated by module 108, such as those shown in FIG. 11B, module 110 calculates a foreground factor for each matting layer $\alpha_{layer}^q$ as follows:

$$F_{layer}(\alpha_{layer}^q) = \frac{\alpha_{FG}^T \alpha_{layer}^q}{1_P^T \alpha_{layer}^q}, \quad (44)$$

where $1_P$ denotes a P×1 all-one vector. FIG. 11B shows the value of the foreground factor for each matting layer. In general, a matting layer with a relatively large foreground factor is more likely to be a portion of the foreground region.

Figure 13:
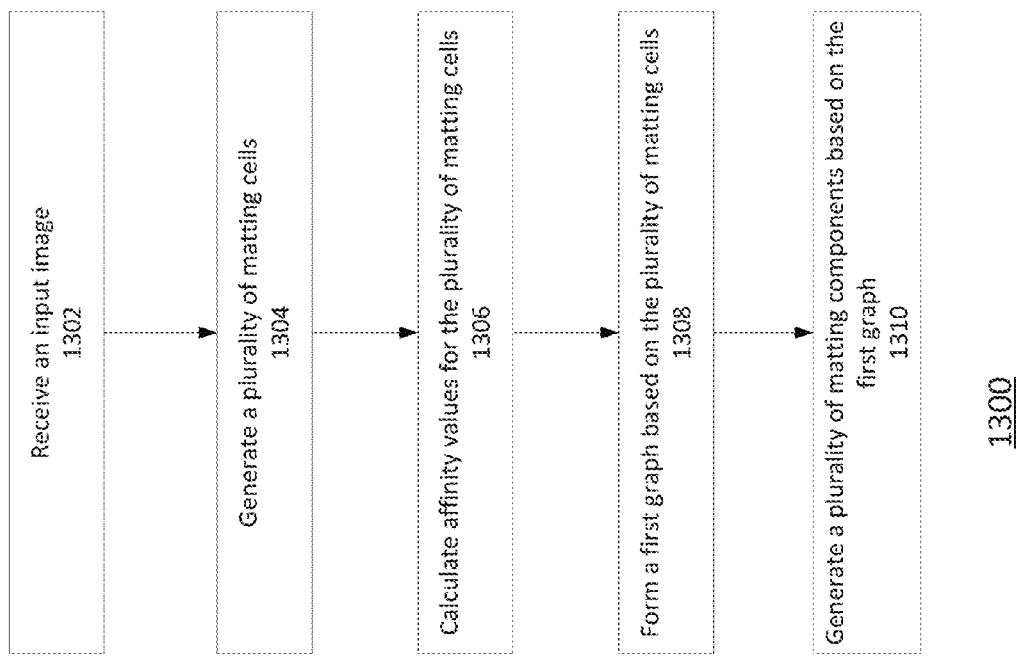
FIG. 13 illustrates a process for image matting and foreground estimation based on hierarchical graphs, according to an embodiment.

FIG. 13 illustrates a flow chart of a process 1300 for image matting and foreground estimation based on hierarchical graphs, according to an embodiment. Process 1300 may be implemented on system 100 according to the techniques disclosed above. In particular, according to process 1300, at step 1302, an input image is received. The input image includes a plurality of image elements, such as pixels. Each pixel includes color values such as those defined according to the known color spaces. At step 1304, a plurality of matting cells is generated based on the input image. Each matting cell includes a group of image elements. The matting cells may be generated by first applying a contraction process to the input image and then mapping the contracted image elements to the matting cells based on affinity relationships among the image elements.

At step 1306, affinity values are calculated for the plurality of matting cells based on the input image. An affinity value indicates the similarity between each pair of matting cells. The affinity values of the cells may be calculated based on the multi-resolution local affinity learning scheme described above with reference to FIGS. 5 and 6.

At step 1308, a first graph, such as the cell-level graph disclosed above, is formed based on the plurality of matting cells and the affinity values. The first graph includes a plurality of first nodes or vertices representing the matting cells and a plurality of first edges associated with the affinity values of the matting cells. At step 1310, a plurality of matting components are generated for the input image based on the first graph. The matting components may be generated by decomposing the first graph based on the affinity values of the matting cells. One or more of the matting components are then identified as belonging to a foreground region of the input image.

Figure 14:
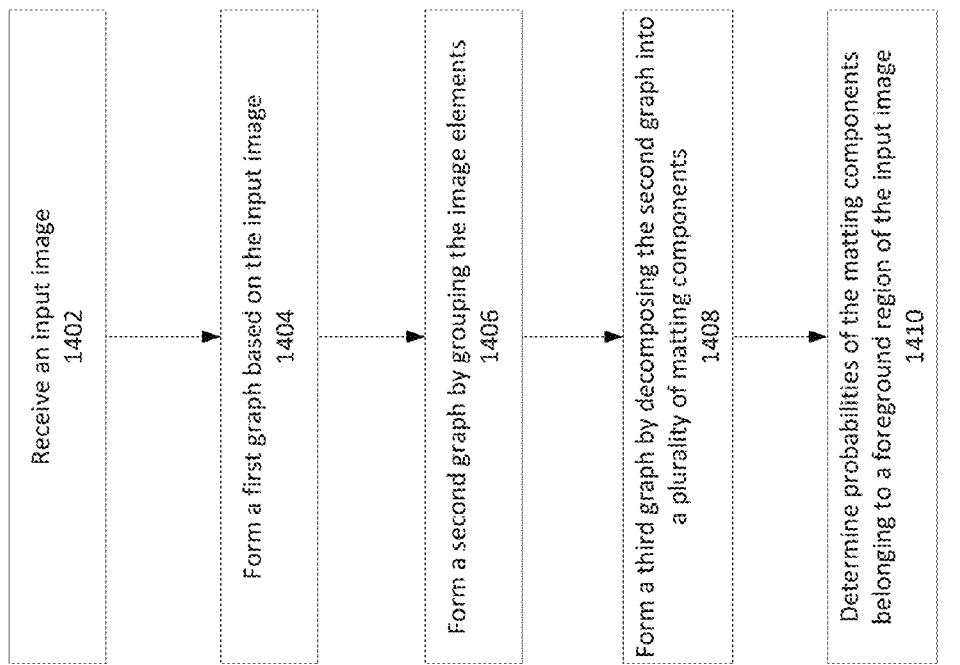
FIG. 14 illustrates a process for image matting and foreground estimation based on hierarchical graphs, according to another embodiment.

FIG. 14 illustrates a flow chart of a process 1400 for image matting and foreground estimation based on hierarchical graphs, according to another embodiment. Process 1400 may be implemented on system 100 according to the techniques disclosed above. In particular, according to process 1400, an input image is received at step 1402. The input image includes a plurality of image elements, such as pixels.

At step 1404, a first graph, such as the pixel-level graph disclosed above, is formed based on the input image. The first graph includes a plurality of first nodes or vertices representing the image elements and a plurality of first edges representing affinity relationships among the image elements. At step 1406, a second graph, such as the cell-level graph disclosed above, is formed by grouping the image elements into a plurality of cells. The second graph includes a plurality of second nodes or vertices representing the cells and a plurality of second edges representing affinity relationships among the cells.

At step 1408, a third graph, such as the component-level graph disclosed above, is formed by decomposing the second graph into a plurality of matting components. The third graph includes a plurality of third nodes or vertices representing the matting components and a plurality of edges representing affinity relationships among the matting components. At step 1410, probability values are determined, indicating the probabilities of the matting components as belonging to a foreground region of the input image based on the third graph.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for image matting based on a hierarchical graph model, comprising:
   receiving an input image including a plurality of image elements;
   generating a plurality of matting cells, the generating including converging a subset of image elements of the plurality of image elements toward each other, wherein each cell includes a group of image elements;
   calculating affinity values for the plurality of matting cells based on the input image; and
   forming a graph based on the plurality of matting cells and the affinity values, the graph including a plurality of nodes representing the matting cells and a plurality of edges associated with the affinity values of the matting cells;
   generating a plurality of matting components for the input image by decomposing the graph; and
   identifying at least one of the matting components belongs to a foreground region of the input image.

2. The method of claim 1, further comprising determining probabilities of the matting components being the foreground region of the input image.

3. The method of claim 2, wherein the graph is a first graph, and the method further comprises:
   forming a second graph based on the matting components, the second graph including a plurality of nodes representing the matting components and a plurality of edges representing affinity relationships among the matting components; and
   calculating a Laplacian matrix based on the second graph; and
   determining the probabilities based on the Laplacian matrix.

4. The method of claim 3, further comprising:
   defining an inconsistency measure based on the Laplacian matrix; and
   determining the probabilities based on the inconsistency measure.

5. The method of claim 1, wherein the graph is a first graph, and the converging further comprises:
   forming a second graph based on the input image, the second graph including a plurality of nodes representing the plurality of image elements and a plurality of edges representing affinity information of the plurality of image elements; and
   generating a contracted image from the input image based on the second graph.

6. The method of claim 5, further comprising:
   defining normalized coordinates for the plurality of image elements; and
   calculating contracted coordinates for the plurality of image elements based on the normalized coordinates and the affinity information of the image elements.

7. The method of claim 6, further comprising generating the plurality of matting cells based in part on the contracted coordinates of the plurality of image elements.

8. The method of claim 7, further comprising:
   defining a coordinate system based on the contracted coordinates and color values of the plurality of image elements; and
   generating the plurality of matting cells by mapping the plurality of image elements to the matting cells based on the coordinate system.

9. The method of claim 1, wherein the calculating of the affinity values of the matting cells further comprises:
   generating a plurality of down-sampled images from the input image;
   extracting a plurality of image patches from the down-sampled images and the input image; and
   determining the affinity values of the matting cells based on the image patches.

10. The method of claim 9, further comprising:
    determining a feature vector for each cell based on image elements within the cell; and
    calculating the affinity value of the cells by applying an affine transformation to the feature vector.

11. The method of claim 10, wherein the graph is a first graph, and the method further comprises:
    defining a global error function based on the affinity values of the cells;
    forming a second graph based on the cells; and
    determining a Laplacian matrix for the second graph based on the global error function.

12. The method of claim 11, wherein the defining of the global error function further comprises:
    defining an error function for each image patches; and
    defining the global error function by calculating a weighted sum of the error functions of the image patches, wherein the global error function includes a weight for each image patch that indicates relative importance of the image patch.

13. The method of claim 11, further comprising normalizing the Laplacian matrix using a degree matrix.

14. The method of claim 13, wherein the generating of the components further comprises:
    generating a plurality of segments from the graph by performing spectral clustering on the graph based on the normalized Laplacian matrix; and
    generating the matting components from the segments by refining the segments.

15. The method of claim 14, further comprising generating a plurality of layers by grouping the matting components based on affinity relationships between the matting components.

16. A method for image matting based on hierarchical graphs, comprising:
    receiving an input image including a plurality of image elements;

forming a first graph based on the input image, the first graph including a plurality of first nodes representing the plurality of image elements and a plurality of first edges representing affinity relationships among the plurality of image elements;

forming a second graph by grouping the plurality of image elements into a plurality of cells, the second graph including a plurality of second nodes representing the cells and a plurality of second edges representing affinity relationships among the cells, wherein the forming of the second graph includes converging a subset of image elements of the plurality of image elements toward each other;

forming a third graph by decomposing the second graph into a plurality of matting components, the third graph including a plurality of third nodes representing the matting components and a plurality of edges representing affinity relationships among the matting components;

determining probabilities of the matting components belonging to a foreground region of the input image based on the third graph; and identifying at least one of the matting components that belongs to a foreground region of the input image.

17. The method of claim 16, wherein the converging further comprises:

applying a contraction process to the input image; and mapping the plurality of image elements to the cells based on the contracted input image and the first graph.

18. The method of claim 16, wherein the converging further comprises:

generating an image pyramid by recursively down-sampling the input image;

extracting a plurality of image patches from the image pyramid; and determining the affinity relationships among the cells based on the image patches.

19. A non-transitory computer-readable medium storing instructions, which, when executed by a processor, cause the processor to perform a method for image matting based on hierarchical graphs, the method comprising:

receiving an input image including a plurality of image elements;

generating a plurality of matting cells, the generating including converging a subset of image elements of the plurality of image elements toward each other, wherein each cell including includes a group of image elements;

calculating affinity values for the plurality of matting cells based on the input image;

forming a graph based on the plurality of matting cells and the affinity values, the graph including a plurality of nodes representing the matting cells and a plurality of edges representing affinity information of the matting cells;

generating a plurality of matting components for the input image by decomposing the graph; and identifying at least one of the matting components that belongs to a foreground region of the input image.

* * * * *